Nov. 18, 1958 M. A. RAUSEO 2,860,673
APPARATUS FOR SHAPING SHEETS OF FLEXIBLE MATERIAL
TO FORM A SHAPED MULTI-PLY ARTICLE
Filed Oct. 2, 1956 3 Sheets-Sheet 1

INVENTOR.
MICHAEL A. RAUSEO
BY Arthur H. Seidel
ATTORNEY

Nov. 18, 1958    M. A. RAUSEO    2,860,673
APPARATUS FOR SHAPING SHEETS OF FLEXIBLE MATERIAL
TO FORM A SHAPED MULTI-PLY ARTICLE
Filed Oct. 2. 1956    3 Sheets-Sheet 2
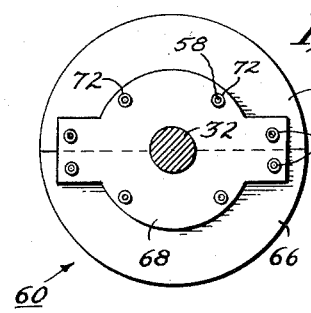
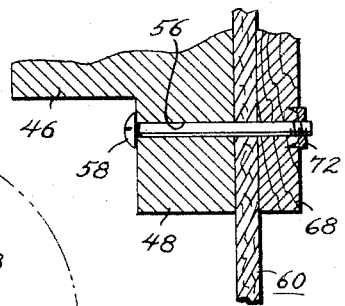
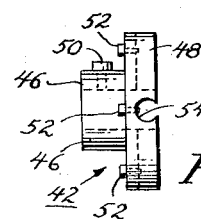
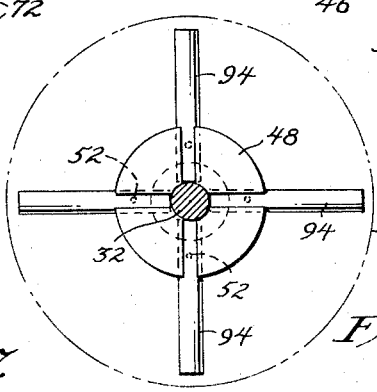
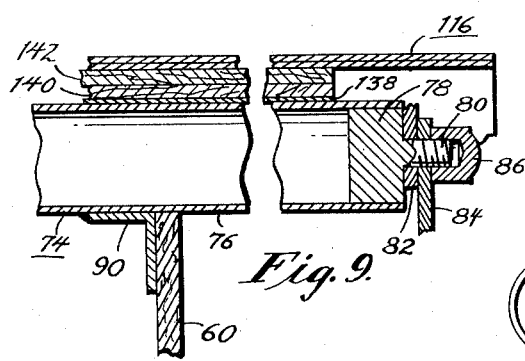
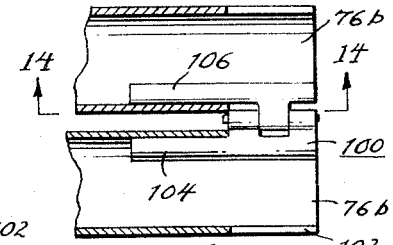
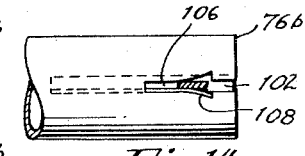
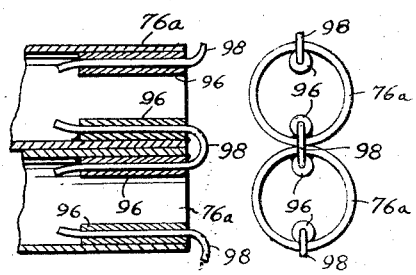
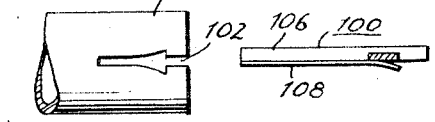
INVENTOR.
MICHAEL A. RAUSEO
BY Arthur H. Seidel
ATTORNEY.

Nov. 18, 1958     M. A. RAUSEO     2,860,673
APPARATUS FOR SHAPING SHEETS OF FLEXIBLE MATERIAL
TO FORM A SHAPED MULTI-PLY ARTICLE
Filed Oct. 2, 1956     3 Sheets-Sheet 3

INVENTOR.
MICHAEL A. RAUSEO
BY Arthur H. Seidel
ATTORNEY.

United States Patent Office 2,860,673
Patented Nov. 18, 1958

2,860,673

APPARATUS FOR SHAPING SHEETS OF FLEXIBLE MATERIAL TO FORM A SHAPED MULTI-PLY ARTICLE

Michael A. Rauseo, Philadelphia, Pa.

Application October 2, 1956, Serial No. 613,536

17 Claims. (Cl. 144—265)

This invention relates to an apparatus for shaping sheets of flexible material to form a shaped multi-ply article, and more particularly to apparatus for shaping sheets of wood or the like to form a plywood type structure of a desired shape.

Conventional means for shaping wood to form shaped plywood structures suffer from numerous serious inadequacies. Thus, conventional means comprising punches and dies are most expensive to manufacture. For short runs, or for custom work, it is not possible by existing apparatus to shape plywood forms economically. Moreover, the use of conventional shaping apparatus for plywood requires a substantial monetary investment upon the part of the user, which renders the provision of such equipment beyond the means of small shops.

It is frequently desirable to form plywood into shapes that are difficult or substantially impossible to obtain by conventional shaping apparatus. For example, the construction of plywood cylinders, or of closed plywood forms having a non-circular cross-section is exceedingly difficult through the use of conventional equipment.

This invention has as an object the provision of apparatus for shaping sheets of flexible material such as plywood or the like to form a shaped multi-ply article.

This invention has as another object the provision of apparatus for forming a shaped multi-ply article which may be set up to produce a wide variety of articles of different shapes.

This invention has as a yet further object the provision of apparatus of the aforesaid type which is of relatively cheap construction and yet of relatively fool-proof operation.

This invention has as a still further object the provision of apparatus of the aforesaid type which may be utilized for the manufacture of multi-ply cylinders of wood and the like.

Other objects will appear hereinafter.

For the purpose of illustrating the invention there is shown in the drawings forms which are presently preferred; it being understood, however, that this invention is not limited to the precise arrangements and instrumentalities shown.

Referring to the drawings wherein like reference characters relate to like parts:

Figure 5 is a view taken on line 5—5 of Figure 4.

Figure 6 is a section taken on line 6—6 of Figure 4.

Figure 7 is an elevation of the flange used in the embodiment shown in Figure 1.

Figure 8 is an elevation showing the use of the flange of Figure 7 applied to a relatively large extender, with extension braces being carried by the flange to insure support for the extender.

Figure 9 is a section on line 9—9 of Figure 2.

Figure 10 is a fragmentary sectional view showing another embodiment for joining the bars of the present invention together.

Figure 11 is an end view of the embodiment shown in Figure 10.

Figure 12 is a fragmentary sectional view of another embodiment of the present invention having different means for joining the bars together in side-by-side disposition to each other.

Figure 13 is an end elevational view of the embodiment of the present invention shown in Figure 12.

Figure 14 is a view taken on line 14—14 of Figure 12.

Figure 15 is an exploded view of the embodiment shown in Figure 12 revealing the insertion of the connecting clip.

Figure 1:
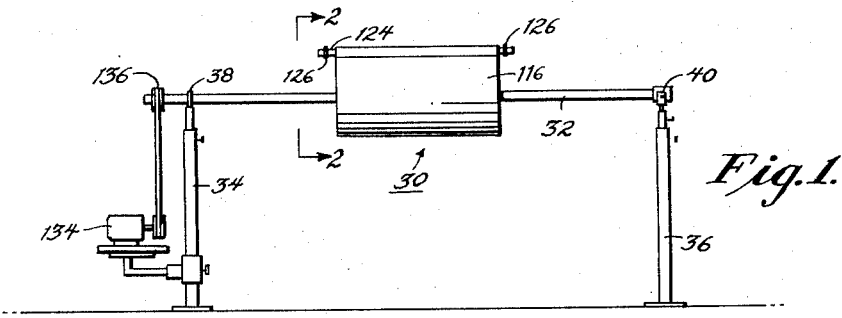
Figure 1 is an elevational view of one embodiment of the apparatus of the present invention.

Referring to the drawings and initially to Figures 1 through 9 inclusive the apparatus of the present invention is designated generally by the numeral 30. The apparatus 30 comprises an axle 32 which may be carried intermediate adjustable uprights 34 and 36, the uppermost ends of uprights 34 and 36 being provided with respective bearings 38 and 40.

A pair of spaced oppositely directed flanges 42 and 44 are provided on axle 32. The flanges 42 and 44 are identical, and accordingly the instant description will be confined to the description of flange 42.

Flange 42 comprises a pair of axially disposed integral collars 46 and 48, with collar 48 being of considerably larger diameter than collar 46. Collar 46 is provided with a set screw 50 positioned to anchor flange 42 to axle 32. The face of collar 48 adjacent collar 46 is provided with set screws 52 which extend into four arcuate slots 54, which are arranged in a crosswise fashion on the face of collar 48 opposite collar 46 (see Figures 7 and 8). Collar 48 is also provided with a plurality of passageways 56 which receive threaded bolts 58.

Extender means comprising a templet 60 adjacent flange 42 and a templet 62 adjacent flange 44 are carried on axle 32. The templets 60 and 62 are identical, and accordingly only templet 60 will be described herein.

The templet 60 (see in particular Figures 2, 4, and 5) comprises a pair of mating members 64 and 66, which may be formed of wood, Masonite, metal, or the like, and in the illustrated embodiment are formed of Masonite. Where as in the illustrated embodiment, the apparatus is to be used for the formation of a cylinder, each of the members 64 and 66 are mirror images, with their combined peripheral edges comprising a circle. However, the apparatus of the subject invention may be used to form articles of non-circular cross-section, in which case the peripheral edges of the members 64 and 66 forming a templet 60 may be of different contour. By varying the dimensions of templets 60 and 62 formed shapes of different sizes may be secured, and by varying the contour of the peripheral edges of the templets 60 and 62 formed objects of different shapes may be secured. Objects of tapered shape may be made by having templets 60 and 62 of somewhat different dimensions, but the amount of taper should not be too great, and the subject apparatus is of maximum utility when the templets 60 and 62 are identical.

A pair of back-plates 68 and 70 are carried on axle 32 adjacent the face of templets 60 and 62 opposite to the flanges 42 and 44. Each of the back-plates 68 and 70 comprises a unitary member formed of fibrous material, such as wood, Masonite, or the like having a center hole through which axle 32 passes. As back-plates 68 and 70 are identical, the subject description will be confined to back-plate 68.

Templet 60 comprising both the member 64 and the member 66 is provided with openings mating with the passageways 56 in collar 48 of flange 42. Preferably, these openings are oversize. Similarly, back-plate 68 is provided with openings mating with the passageways 56 in collar 48. Bolts 58 may thus be extended through passageways 56 and through the mating openings in templet 60 and back-plate 68 and secured (as shown particularly in Figure 6) by means of tined locknuts 72 to back-plate 68.

Figure 2:
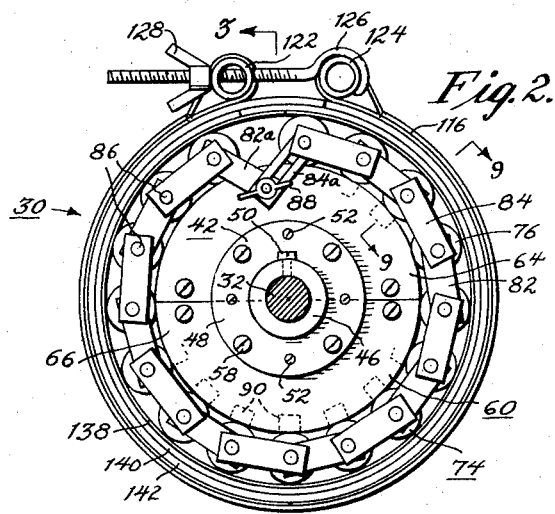
Figure 2 is an end view taken on line 2—2 of Figure 1.
Figure 4:
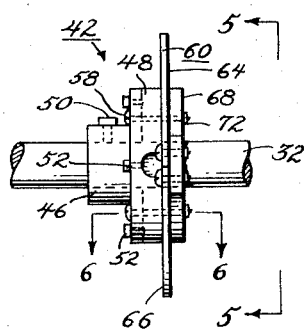
Figure 4 is a fragmentary view revealing the construction of one of the flanges of the embodiment of the present invention shown in Figure 1.

A closed cordon of bars designated generally by the numeral 74 are distendably carried about templets 60 and 62. Each bar designated by the numeral 76 may be formed from metal tubing whose ends are plugged as by plugs 78. Each of the plugs 78 may be provided with an integral threaded stud 80 upon which a pair of links 82 and 84 are carried, with the links being retained in position on stud 80 by means of nut 86. The use of links 82 and 84 permits the bars 76 to be disposed in close side-by-side disposition to form the closed cordon 74. For rapid assembly and disassembly of closed cordon 74 a wingnut and bolt 88 may be provided to join the links 82a and 84a which connect the endmost bars forming the cordon of bars 74. Preferably, as shown in Figure 2, link 84a is slotted to provide for accommodation in position behind link 84a and link 82a.

Figure 3:
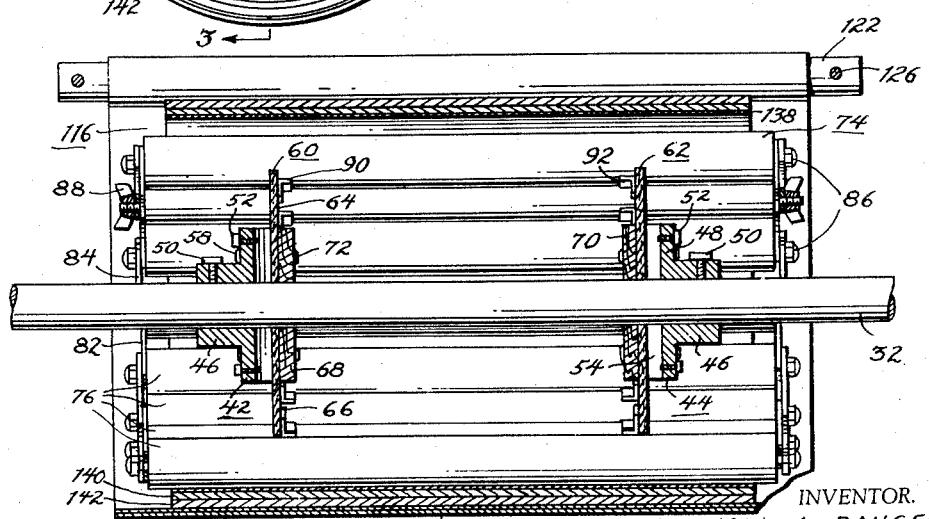
Figure 3 is a longitudinal sectional view taken on line 3—3 of Figure 2.
Figure 16:
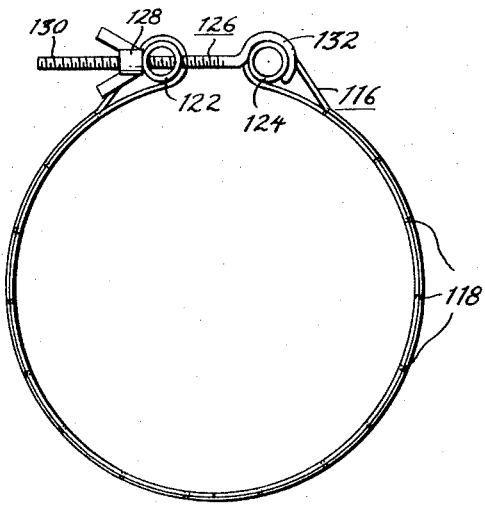
Figure 16 is an elevational view of the blanket used in the present invention.
Figure 17:
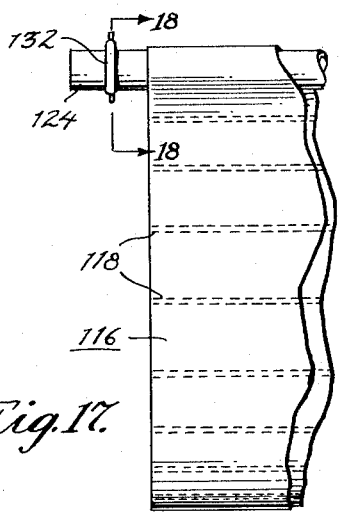
Figure 17 is a fragmentary elevational view taken at right angles to Figure 16.

Each of the bars 76 forming the cordon of bars 74 is provided with a bracket 90 formed of angle iron or the like against which the templet 60 is seated. Each of the bars 76 forming the cordon of bars 74 is also provided with a bracket 92 against which the templet 62 is seated. As shown particularly in Figure 3 the brackets 90 and 92 are spaced somewhat from the outermost ends of each of the bars 76 a sufficient distance to provide for the inclusion of the templets 60 and 62 and the flanges 42 and 44 within the cordon 74. In this manner, the bars 76 may be maintained relatively close together (such as a spaced distance between the peripheries of the bars 76 of an eighth of an inch) and when so maintained will faithfully reflect the contour of the templets 60 and 62.

Where the templets 60 and 62 are of relatively small size and are not considerably larger in diameter than the flanges 42 and 44, the arrangement shown in Figure 3 may be utilized. However, where the templets are of relatively large size, as is the templet 60a whose outline is shown in phantom in Figure 8, then support rods 94 should be positioned within arcuate slots 54 in order to brace the templet. Support rods 94 may be secured in position within arcuate slots 54 by set-screws 52. Preferably, the support rods 94 comprise solid cylindrical rods of metal, with four such rods being used for the cross arrangement of arcuate slots shown in the illustrated embodiment.

In place of the link means, such as the links 82 and 84 used in the embodiment which has heretofore been described, alternative means for connecting the bars 76 in close side-by-side disposition to each other to form a cordon are disclosed in Figures 10 and 11, and in Figures 12, 13, 14 and 15.

In the alternative connecting means shown in Figures 10 and 11 each of the bars 76a is provided with a relatively small metal tube 96 fixedly secured to its inner wall surface adjacent each of its ends. The bars 76a are connected together by inserting a bent U-shaped spring metal connector 98 through the tubes 96 of adjacent bars 76a.

In the embodiment of the present invention shown in Figures 12, 13, 14, and 15 the connecting means for adjacent bars 76b comprises hinge 100. In this embodiment each of the bars is provided with an arrow head slot 102 at each of its ends. The hinge 100 comprises a pair of legs 104 and 106, each of which is provided with an attached leaf spring element 108. The insertion of hinge 100 into arrow head slot 102 is accomplished by wedgingly moving a leg 104 inside the bar 76b with the leaf spring element descending therewith in slot 102, until the leaf spring element 108 passes the flared portion of arrow head slot 102, at which time the leaf spring element 108 springs into the recess provided by such flared portion of the slot 102 and assumes the position shown particularly well in Figure 14. Removal of the hinge 100 may be accomplished by the use of a pick or other means for deflecting the leaf spring element 108 from the flared portion of slot 102.

Figure 21:
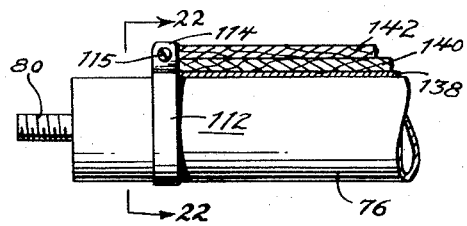
Figure 21 is a fragmentary view of one of the bars used in the present invention provided with a stop clip.
Figure 22:
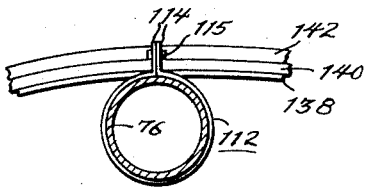
Figure 22 is a view taken on line 22—22 of Figure 21.

Some of the bars 76 may be provided with stops (see Figures 21 and 22), said stops comprising a clip 112 formed of spring metal or the like which embraces the bar 76, with the clip 112 having outwardly extending perforated arms 114. Such arms 114 may be joined together by means of nut and bolt 115.

The apparatus 30 of the present invention also includes a blanket designated generally as 116. Such blanket 116 is preferably formed of canvas or like flexible fabric folded back upon itself to form a two-ply blanket, with the folded back plies joined together by spaced parallel lines of stitching 118 to form a series of parallel tubes 120.

Figures 18, 19, 20:
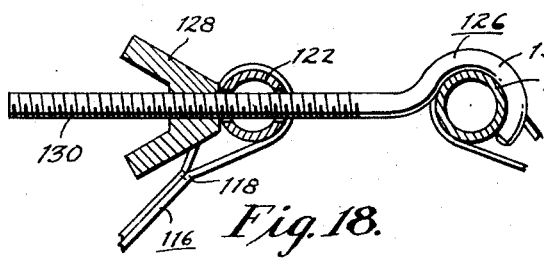
Figure 18 is a view taken on line 18—18 of Figure 17.
Figure 19 is an end elevational view of the blanket of the present invention with a tension bar position in the last tube thereof.
Figure 20 is an end elevational view of the blanket of the present invention with a tension bar positioned in the endmost tube thereof.

The parallel tubes 120 permit adjustment of the length of blanket 116. Thus, tension bars 122 and 124 having a length greater than the width of blanket 116 may be selectively inserted within spaced tubes 120 in order to accommodate for cordons of different sizes. Thus, as shown in Figure 19 the tension bar 124 may be positioned in an end tube 120, or as shown in Figure 20 may be positioned in a tube other than an end tube.

The blanket 116 is wrapped about the cordon of bars 74 and may be tightened thereabout. The tightening of blanket 116 about cordon 74 is accomplished by means of threaded hook bolt 126 and nut 128. Thus, the threaded shaft 130 of hook bolt 126 passes through an oversize opening in tension bar 122 with the hook portion 132 embracing the outside of tension bar 124. Tightening of nut 128 on threaded shaft 130 (the rotation of nut 128 may be accomplished by plier means or the like) forces tension bar 122 towards tension bar 124 tightening the blanket 116 about cordon 74.

As shown in Figure 1, a pair of hook bolts 126 are provided, one for each end of the tension bars 122 and 124. This permits substantially uniform tensioning of the blanket 116 about the cordon 74.

As shown in Figure 1, an electric motor 134 and a pulley and belt 136 may be provided for rotating axle 32. As will be more fully explained below, the rotation of axle 32 permits a multi-ply object mounted on cordon 74 to be turned, as by means of a cutting tool engaging the outermost surface of such object.

The operation of the apparatus 30 of the present invention is as follows:

Flange 42 and its associated back-plate 68 and flange 44 and its associated back-plate 70 are mounted on axle 32. The templet 60 comprising members 64 and 66 is inserted between flange 42 and back-plate 68, and the assembly of flange 42, templet 60, and back-plate 68 joined together by means of bolts 58 and tined lock nuts 72. Similarly, the assembly of flange 44, templet 62 and back-plate 70 is also effected.

A single bar 76 of cordon 74 is placed adjacent templets 60 and 62 in order to secure the proper spacing between such templets 60 and 62 conforming with the spacing between the juxtaposed portions of brackets 90 and 92. The set screw 50 on each of the flanges 42 and 44 is then tightened, positioning such flanges on the axle 32.

The cordon 74 is then disposed about the templets 60 and 62 with the wingnuts and bolts 88 tightened to close the cordon. If desired, the set screws 50 of the flanges 42 and 44 may be loosened and reset during the adjustment of the cordon 74 about the templets 60 and 62 in order to provide for optimum positioning of the flanges 42 and 44. Moreover, if desired, the conformity of the cordon 74 to the peripheral edges of templets 60 and 62 may be assured prior to the final tightening of wingnuts and bolts 88 by wrapping blanket 116 about cordon 74 and tightening blanket 116 through the rotation of nut 128 in the manner heretofore indicated. Wingnuts and bolts 88 may be tightened when the cordon 74 is retained in its conformed position by means of tightened blanket 116.

The cordon 74 will assume the contour of the juxtaposed peripheral edges of templets 60 and 62. Thus, the dimensions of the cordon 74 and its contour may be varied by varying the size and shape of templets 60 and 62. Inasmuch as templets 60 and 62 may be readily cut out from a tracing, the subject apparatus permits facile changes in size and shape to be made.

In order to produce a shaped multi-ply article, a thin layer of cardboard 138 is wrapped about cordon 74. The cardboard layer is then tightened about cordon 74 to assume the shape of the juxtaposed surfaces of bars 76 by tightening blanket 116 thereabout. If a closed object, such as a cylinder, is desired, then the ends of the wrapped about thin cardboard layer 138 may be joined together in abutting relationship by means of pressure sensitive tape or other suitable means.

An innermost ply 140 of flexible material, such as a ply of wood or the like, is wrapped about cardboard layer 138. The face of ply 140 juxtaposed to cardboard layer 138 may be partially or entirely coated with cement. Ply 140 is conformed to the shape of cardboard layer 138 by tightening blanket 116 thereabout. With ply 140 in such conformed configuration, the cement on the innermost surface thereof may be set, securing ply 140 to cardboard layer 138.

After ply 140 has been joined or partially joined to cardboard layer 138, blanket 116 is removed and an outer ply 142, which may be the same wood as or different wood from ply 140, and which is coated on its inner face with a cement or other adhesive is wrapped about ply 140. Blanket 116 is then used to tighten ply 142 about ply 140. When ply 142 assumes the configuration of ply 140, the cement on the inner face of ply 142 is set joining ply 142 to ply 140.

The blanket 116 may then be removed and the process repeated adding the requisite number of plies to form a multi-ply article having a desired number of plies and a desired shape.

The clips 112 may be used as stops against which the plies 138, 140, and 142 may be positioned. The use of such clips 112 prevents uneven overlapping of the plies.

The motor 134 and pulley and belt 136 permit the axle 32 to be rotated at any desired speed. Turning of the outermost ply or of a plurality of plies may be accomplished by placing a cutting edge against the shaped object while axle 32 is turning.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for shaping a plurality of plies of flexible material to form a shaped multi-ply article, said apparatus including an axle, a plurality of closely spaced rigid bars disposed about said axle, means connecting each of said bars in close side-by-side disposition to each other to form a closed cordon, extender means having a shaped outer edge of predetermined configuration, said extender means being radially mounted on said axle and disposed intermediate said axle and said cordon of bars, said extender means being distendably engaged with said cordon of bars whereby said cordon of bars are disposed along the shaped outer edge of said extender means in conformity with the shape of said outer edge, a blanket of flexible material, and means for tightening said blanket about said cordon of bars.

2. Apparatus for shaping a plurality of plies of flexible material to form a shaped multi-ply article, said apparatus including an axle, a plurality of closely spaced rigid bars disposed about said axle, means connecting each of said bars in close side-by-side disposition to each other to form a closed cordon, extender means having a shaped outer edge of predetermined configuration, said extender means being radially mounted on said axle and disposed intermediate said axle and said cordon of bars, said extender means being distendably engaged with said cordon of bars whereby said cordon of bars are disposed along the shaped outer edge of said extender means in conformity with the shape of said outer edge, an inwardly extending retention bracket on at least one of said bars engaged with an end face of said extender means, a blanket of flexible material, and means for tightening said blanket about said cordon of bars.

3. Apparatus for shaping a plurality of plies of flexible material to form a shaped multi-ply article, said apparatus including an axle, a plurality of closely spaced rigid bars disposed about said axle, outwardly projecting studs on each end of each of said bars, links lockingly carried on each of said studs connecting each of said bars in close side-by-side disposition to each other to form a closed cordon, extender means having a shaped outer edge of predetermined configuration, said extender means being radially mounted on said axle and disposed intermediate said axle and said cordon of bars, said extender means being distendably engaged with said cordon of bars whereby said cordon of bars are disposed along the shaped outer edge of said extender means in conformity with the shape of said outer edge, a blanket of flexible material, and means for tightening said blanket about said cordon of bars.

4. Apparatus for shaping a plurality of plies of flexible material to form a shaped multi-ply article, said apparatus including an axle, a plurality of closely spaced rigid bars disposed about said axle, spring clips connecting each of said bars in close side-by-side disposition to each other to form a closed cordon, extender means having a shaped outer edge of predetermined configuration, said extender means being radially mounted on said axle and disposed intermediate said axle and said cordon of bars, said extender means being distendably engaged with said cordon of bars whereby said cordon of bars are disposed along the shaped outer edge of said extender means in conformity with the shape of said outer edge, a blanket of flexible material, and means for tightening said blanket about said cordon of bars.

5. Apparatus for shaping a plurality of plies of flexible material to form a shaped multi-ply article, said apparatus including an axle, a plurality of closely spaced rigid bars disposed about said axle, hinges connecting each of said bars in close side-by-side disposition to each other to form a closed cordon, extender means having a shaped outer edge of predetermined configuration, said extender means being radially mounted on said axle and disposed intermediate said axle and said cordon of bars, said extender means being distendably engaged with said cordon of bars whereby said cordon of bars are disposed along the shaped outer edge of said extender means in conformity with the shape of said outer edge, a blanket of flexible material, and means for tightening said blanket about said cordon of bars.

6. Apparatus for shaping a plurality of plies of flexible material to form a shaped multi-ply article, said apparatus including an axle, a plurality of closely spaced rigid bars disposed about said axle, movable stops on at least one of said bars projecting radially outwardly therefrom, means connecting each of said bars in close side-by-side disposition to each other to form a closed cordon, extender means having a shaped outer edge of predetermined configuration, said extender means being radially mounted on said axle and disposed intermediate said axle and said cordon of bars, said extender means being distendably engaged with said cordon of bars whereby said cordon of bars are disposed along the shaped outer edge of said extender means in conformity with the shape of said outer edge, a blanket of flexible material, and means for tightening said blanket about said cordon of bars.

7. Apparatus for shaping a plurality of plies of flexible material to form a shaped multi-ply article, said apparatus including an axle, a plurality of closely spaced rigid bars disposed about said axle, means connecting each of said bars in close side-by-side disposition to each other to form a closed cordon, extender means having a shaped outer edge of predetermined configuration, said extender means being radially mounted on said axle and disposed intermediate said axle and said cordon of bars, said extender means being distendably engaged with said cordon of bars whereby said cordon of bars are disposed along the shaped outer edge of said extender means in conformity with the shape of said outer edge, a blanket of flexible material comprising a plurality of spaced parallel tubes, a pair of tension bars positioned within separate tubes of said spaced parallel tubes in said blanket, and means for tightening said blanket about said cordon of bars comprising clamping means for urging said tension bars together.

8. Apparatus for shaping a plurality of plies of flexible material to form a shaped multi-ply article, said apparatus including an axle, a plurality of closely spaced rigid bars disposed about said axle, means connecting each of said bars in close side-by-side disposition to each other to form a closed cordon, at least one flange secured to said axle, a radially outwardly extending multipiece templet carried by said axle and removably secured to said flange, said templet being of larger diameter than said flange and having a shaped outer edge of predetermined configuration, said templet distendably engaging said cordon of bars whereby said cordon of bars is disposed along the shaped outer edge of said templet in conformity with the shape of said outer edge, a blanket of flexible material, and means for tightening said blanket about said cordon of bars.

9. Apparatus for shaping a plurality of plies of flexible material to form a shaped multi-ply article, said apparatus including an axle, a plurality of closely spaced rigid bars disposed about said axle, means connecting each of said bars in close side-by-side disposition to each other to form a closed cordon, at least one flange secured to said axle, a radially outwardly extending multipiece templet carried by said axle and removably secured to said flange, said templet being of larger diameter than said flange and having a shaped outer edge of predetermined configuration, said templet distendably engaging said cordon of bars whereby said cordon of bars is disposed along the shaped outer edge of said templet in conformity with the shape of said outer edge, an inwardly extending retention bracket on at least one of said bars engaged with an end face of said templet, a blanket of flexible material, and means for tightening said blanket about said cordon of bars.

10. Apparatus for shaping a plurality of plies of flexible material to form a shaped multi-ply article, said apparatus including an axle, a plurality of closely spaced rigid bars disposed about said axle, means connecting each of said bars in close side-by-side disposition to each other to form a closed cordon, a pair of spaced flanges removably secured to said axle, a pair of radially outwardly extending multipiece templets carried by said axle with each of said templets removably secured to a flange, each of said templets being of larger diameter than its associated flange and having a shaped outer edge of predetermined configuration, each of said templets distendably engaging said cordon of bars whereby said cordon of bars is disposed along the shaped outer edge of each said templet in conformity with the shape of said outer edge, a blanket of flexible material, and means for tightening said blanket about said cordon of bars.

11. Apparatus for shaping a plurality of plies of flexible material to form a shaped multi-ply article, said apparatus including an axle, a plurality of closely spaced rigid bars disposed about said axle, means connecting each of said bars in close side-by-side disposition to each other to form a closed cordon, a pair of spaced flanges removably secured to said axle, a radially outwardly extending split two piece templet associated with each flange, a unitary plate carried by said axle adjacent to each templet and juxtaposed to the face of the templet opposite the templet's associated flange, means joining each flange to its associated templet and plate, each of said templets being of larger diameter than its associated flange and having a shaped outer edge of predetermined configuration, each of said templets distendably engaging said cordon of bars whereby said cordon of bars is disposed along the shaped outer edge of each said templet in conformity with the shape of said outer edge, a pair of inwardly extending retention brackets on a plurality of said bars, each bracket of each said pair engaged with an inner end face of a separate templet, a blanket of flexible material, and means for tightening said blanket about said cordon of bars.

12. Apparatus in accordance with claim 11 in which each of the bars forming the cordon are connected together by links carried on the ends of the bars.

13. Apparatus in accordance with claim 11 in which each of the bars forming the cordon are connected together by spring clips.

14. Apparatus in accordance with claim 11 in which each of the bars forming the cordon are connected together by hinges.

15. Apparatus in accordance with claim 11 in which a plurality of the bars forming the cordon are provided with movable stops projecting radially outwardly therefrom.

16. Apparatus for shaping a plurality of plies of flexible material to form a shaped multi-ply article, said apparatus including an axle, a plurality of closely spaced rigid bars disposed about said axle, movable stops on at least one of said bars projecting radially outwardly therefrom, means connecting each of said bars in close side-by-side disposition to each other to form a closed cordon, a pair of spaced flanges removably secured to said axle, a radially outwardly extending split two piece templet associated with each flange, a unitary plate carried by said axle adjacent to each templet and juxtaposed to the face of the templet opposite the templet's associated flange, means joining each flange to its associated templet and plate, each of said templets being of larger diameter than its associated flange and having a shaped outer edge of predetermined configuration, each of said templets distendably engaging said cordon of bars whereby said cordon of bars is disposed along the shaped outer edge of each said templet in conformity with the shape of said outer edge, a pair of inwardly extending retention brackets on a plurality of said bars, each bracket of each said pair engaged with an inner end face of a separate templet, a blanket of flexible material comprising a plurality of spaced parallel tubes, a pair of tension bars positioned within separate tubes of said spaced parallel tubes in said blanket, and means for tightening said blanket about said cordon of bars comprising clamping means for urging said tension bars together.

17. Apparatus for shaping a plurality of plies of flexible material to form a shaped multi-ply article, said apparatus including an axle, uprights supporting said axle at a spaced distance above a supporting surface, means for rotating said axle, a plurality of closely spaced rigid bars disposed about said axle, means connecting each of said bars in close side-by-side disposition to each other to form a closed cordon, extender means having a shaped outer edge of predetermined configuration, said extender means being radially mounted on said axle and disposed intermediate said axle and said cordon of bars, said extender means being distendably engaged with said cordon of bars whereby said cordon of bars are disposed along the shaped outer edge of said extender means in conformity with the shape of said outer edge, a blanket of flexible material and means for tightening said blanket about said cordon of bars.

References Cited in the file of this patent

UNITED STATES PATENTS

| | | |
|---|---|---|
| 801,889 | Mellen | Oct. 17, 1905 |
| 1,460,460 | Walker | July 3, 1923 |
| 2,000,544 | Winchell | May 7, 1935 |
| 2,090,415 | Homey | Aug. 17, 1937 |

FOREIGN PATENTS

| | | |
|---|---|---|
| 990,594 | France | June 6, 1951 |